(12) United States Patent
Kue

(10) Patent No.: US 10,612,511 B2
(45) Date of Patent: Apr. 7, 2020

(54) POWER SYSTEM

(71) Applicant: Ying Kue, Cottage Grove, MN (US)

(72) Inventor: Ying Kue, Cottage Grove, MN (US)

( * ) Notice: Subject to any disclaimer, the term of this patent is extended or adjusted under 35 U.S.C. 154(b) by 0 days.

(21) Appl. No.: 16/336,760

(22) PCT Filed: Oct. 11, 2018

(86) PCT No.: PCT/US2018/055348
§ 371 (c)(1),
(2) Date: Mar. 26, 2019

(87) PCT Pub. No.: WO2019/075163
PCT Pub. Date: Apr. 18, 2019

(65) Prior Publication Data
US 2019/0353138 A1  Nov. 21, 2019

Related U.S. Application Data

(60) Provisional application No. 62/570,909, filed on Oct. 11, 2017.

(51) Int. Cl.
*F03B 7/00* (2006.01)
*F03B 11/00* (2006.01)

(52) U.S. Cl.
CPC ............ *F03B 7/003* (2013.01); *F03B 11/002* (2013.01)

(58) Field of Classification Search
CPC ...... F03B 7/003; F03B 11/002; F03B 17/063; F04D 25/04
See application file for complete search history.

(56) References Cited

U.S. PATENT DOCUMENTS

2006/0033341 A1  2/2006  Kaufman
2011/0316280 A1  12/2011  Khesali

FOREIGN PATENT DOCUMENTS

CN        104976048 A       10/2015
DE   102005041899 A1 *  3/2007  .............. F03B 17/02
(Continued)

OTHER PUBLICATIONS

International Search Report and Written Opinion dated Dec. 12, 2018 for corresponding International Application No. PCT/US2018/055348, filed Oct. 11, 2018.

*Primary Examiner* — Moshe Wilensky
*Assistant Examiner* — Jesse M Prager
(74) *Attorney, Agent, or Firm* — Westman, Champlin & Koehler, P.A.

(57) ABSTRACT

A power system includes a first wheel coupled to a first turbine. The first wheel includes a first central hub on a first central axis, and a first plurality of water scoops arranged at a radial distance from the central hub, the first plurality of water scoops arranged to engage a water source to turn the first wheel on the first central hub about the first central axis. The first wheel has a first plurality of weights arranged substantially equally spaced about a circumferential portion of the first wheel. A second wheel is coupled to a second turbine, and includes a second central hub on a second central axis, and a second plurality of water scoops arranged to engage the water source to turn the second wheel about the second central axis, the second wheel having a plurality of weights arranged substantially equally spaced about a circumferential portion of the second wheel. An air conduit is coupled to a blower of the second turbine to receive blown air from the blower and to blow air through the conduit into the plurality of water scoops of the first and of the second wheels.

18 Claims, 21 Drawing Sheets

(56) References Cited

FOREIGN PATENT DOCUMENTS

FR 2319029 A1 * 2/1977 .............. F03B 17/04
WO 2010119283 A2 10/2010

* cited by examiner

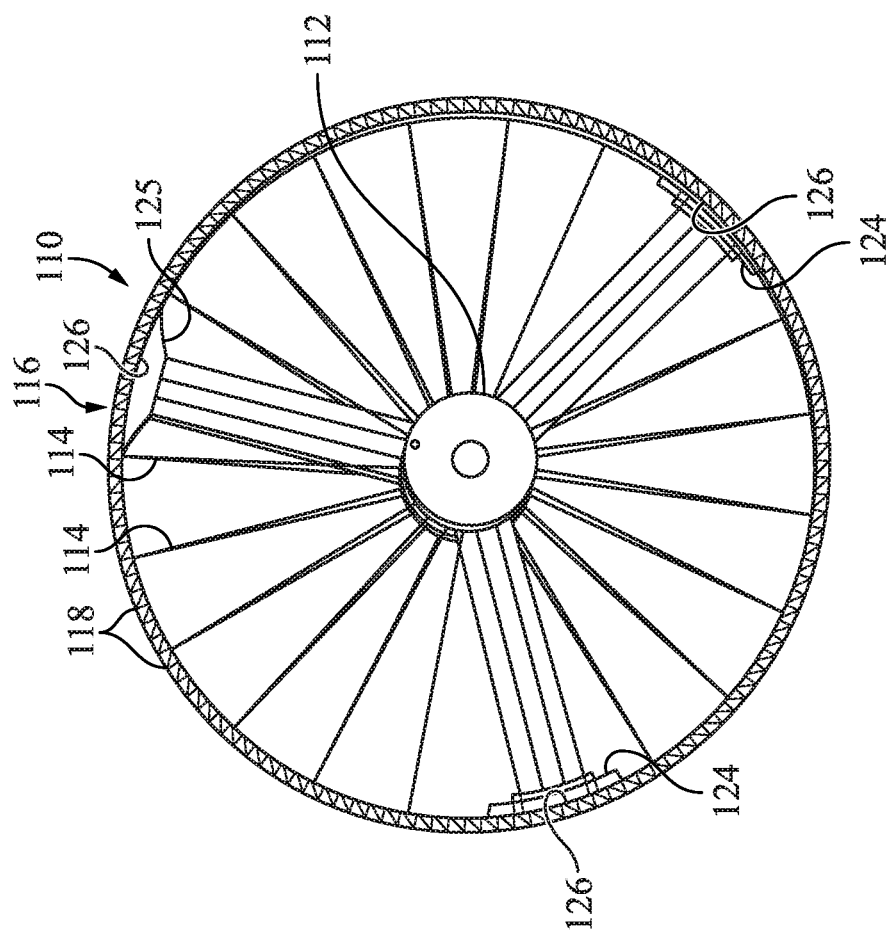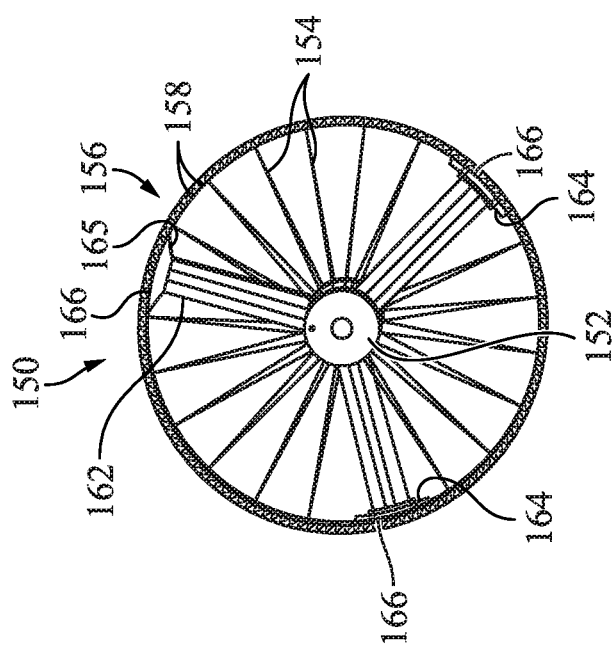
FIG. 3

POWER SYSTEM

CROSS-REFERENCE TO RELATED APPLICATION

This Application is a Section 371 National Stage Application of International Application No. PCT/US2018/055348, filed Oct. 11, 2018, in English, which claims priority to U.S. Application No. 62/570,909, filed Oct. 11, 2017, the contents of which are hereby incorporated by reference in their entirety.

BACKGROUND

The present disclosure relates to the provision of power in locations where infrastructure prevents reliable power delivery or fails to have reliable power delivery due to extreme conditions such as location, climate, and/or economic conditions.

Water flowing in a stream or river provides a source of energy provided it can be properly harnessed. Wind can also provide a source of energy when captures. The power of gravity on weights may be captures in the proper environment. Other forms of energy such as magnetic energy may also be harnessed. While one of these sources of energy may be captured by known devices, the embodiments of the disclosure capture energy with a combination of devices, and use those with each other to provide harnessable energy from multiple sources at once. Embodiments of the present disclosure further use the various energy sources in different ways to assist in efficiency of the devices and methods described herein.

SUMMARY

In one embodiment, a power system includes a first wheel coupled to a first turbine. The first wheel includes a first central hub on a first central axis, and a first plurality of water scoops arranged at a radial distance from the central hub, the first plurality of water scoops arranged to engage a water source to turn the first wheel on the first central hub about the first central axis. The first wheel has a first plurality of weights arranged substantially equally spaced about a circumferential portion of the first wheel. A second wheel is coupled to a second turbine, and includes a second central hub on a second central axis, and a second plurality of water scoops arranged to engage the water source to turn the second wheel about the second central axis, the second wheel having a plurality of weights arranged substantially equally spaced about a circumferential portion of the second wheel. An air conduit is coupled to a blower of the second turbine to receive blown air from the blower and to blow air through the conduit into the plurality of water scoops of the first and of the second wheels.

In other aspects of the power system, the circumferential portions of the first and the second wheels each comprise a lightweight core and a reinforcing exterior. In another aspect, each plurality of weights is arranged on supporting spokes of its respective wheel. In another aspect, the first plurality of weights comprises three weights. In another aspect, the second plurality of weights comprises three weights. The first wheel in one aspect includes a plurality of spokes, each spoke extending from the central hub to the circumferential portion. Each of the plurality of spokes may comprises a weight positioned at the circumferential portion.

In another aspect, the power system further includes a first plurality of magnets arranged on the circumferential portion of the first wheel, and at least a first magnetic driver arranged to engage the first plurality of magnets as the first wheel rotates about the first central axis. In another aspect, the power system further includes a second plurality of magnets arranged on the circumferential portion of the second wheel, and at least a second magnetic driver arranged to engage the second plurality of magnets as the second wheel rotates about the second central axis.

In another embodiment, a method of providing electric power includes positioning a first wheel in a source of flowing water, the first wheel comprising a first central hub on a first central axis, and first plurality of water scoops arranged at a radial distance from the central hub, the first plurality of water scoops arranged to engage the source of flowing water to turn the first wheel on the first central hub about the first central axis using water engaging the first plurality of water scoops; and positioning a second wheel, smaller than the first wheel, in the source of flowing water, the second wheel comprising a second central hub on a second central axis, and a second plurality of water scoops arranged to engage the water source to turn the second wheel about a second central axis, the second wheel having a plurality of weights arranged substantially equally spaced about a circumferential portion of the second wheel. The first wheel is coupled to a first turbine to provide external electric power. The second wheel is coupled to a second turbine. Air is blown from a blower of the second turbine to the first plurality of water scoops and to the second plurality of water scoops.

Other aspects of the method include providing an air conduit from the second turbine to the first plurality of water scoops near a level of the source of flowing water, and from the second turbine to the second plurality of water scoops bear the level of the source of flowing water, to provide blown air into the first plurality of water scoops and into the second plurality of water scoops.

Other aspects of the method include positioning a first plurality of weights substantially at and equally spaced about a circumferential portion of the first wheel distal from the first central hub. Each plurality of weights may be positioned on supporting spokes of its respective wheel. The first central hub and/or the second central hub are positioned at or near ground level in another aspect. Another aspect of the method includes providing a first plurality of magnets arranged on the circumferential portion of the first wheel, and at least a first magnetic driver arranged to engage the first plurality of magnets as the first wheel rotates about the first central axis. Another aspect of the method includes providing a second plurality of magnets arranged on the circumferential portion of the second wheel, and at least a second magnetic driver arranged to engage the second plurality of magnets as the second wheel rotates about the second central axis.

BRIEF DESCRIPTIONS OF THE DRAWINGS

FIG. 3 is an elevation view of wheels according to an embodiment of the present disclosure;

DETAILED DESCRIPTION

Figure 1:
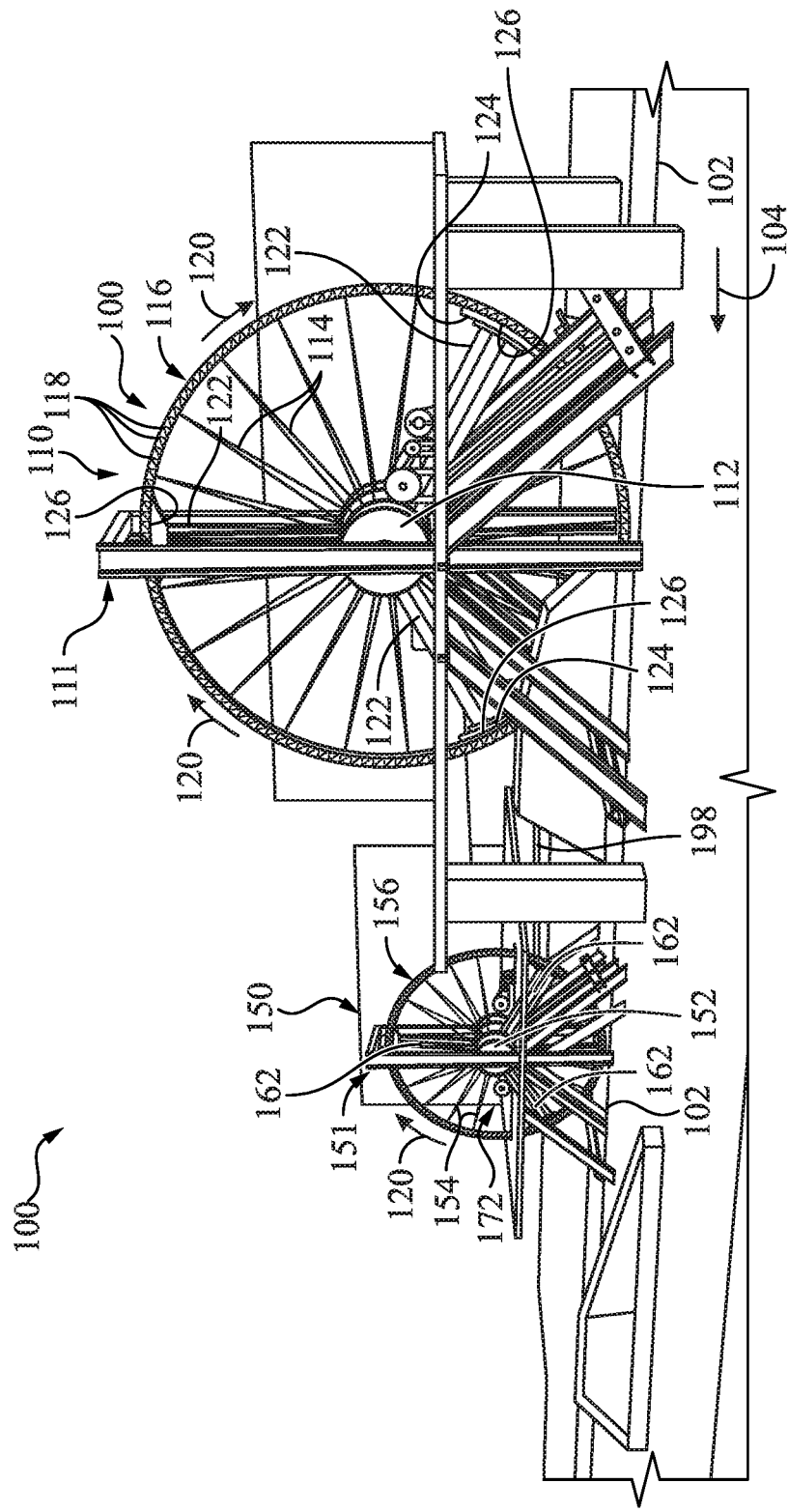
FIG. 1 is a perspective view of an embodiment of the present disclosure.

FIG. 1 is a perspective view of an embodiment 100 of a power harnessing device. Power harnessing device 100 comprises in one embodiment first and second wheels 110 and 150. First wheel 110 is in one embodiment a first size, and second wheel 150 is in one embodiment a second size, with the second size being smaller than the first size. Wheels 110 and 150 are in one embodiment used for separate purposes. Wheels 110, 150 are supported in one embodiment by a frame 111, 151, respectively.

Wheel 110 is constructed to be partially immersed in moving water 102, which in FIG. 1 is flowing in the direction of arrow 104, first past the first wheel 110 and then past the second wheel 150. Water 102 includes but is not limited to water flowing in a stream or river, such as down a mountain- or hill-side. The construction of hydro-magnetic wheel 110 in one embodiment is as follows. Wheel 110 has a central hub 112 and a plurality of support wires or spokes 114 that extend between the central hub 112 and the outer rim 116 of the wheel 110. Outer rim 116 comprises in one embodiment a plurality of scoops 118 (see also FIG. 2) designed to catch water 102 therein and rotate the wheel 110 about the hub 11 in the direction of arrow 120. Scoops 118 are shown in one configuration, but it should be understood that additional or different configurations may be used without departing from the scope of the disclosure. As water 102 flows in direction 104 and engages wheel 110, such as at scoops 118, the wheel 110 rotates about central hub 112 in the direction of arrow 120.

In one embodiment, wheel 110 has three large beam structures 122 that extend between the outer rim 116 and the central hub 112. The beam structures 122 are spaced at substantially equal 120 degree intervals in one embodiment. The beam structures 122 provide additional stability to the wheel 110, as well as provide a support for the addition of weights 124 at the points 126 where the beam structures 122 adjoin the outer rim 116. Weights 124 in one embodiment are provided at the outer rim 116 at 120 degree spacing about the outer rim. In one embodiment, weights 124 are covered with a cover 125 for increased resistance to the elements and for streamlining the wheel 110.

Figure 2:
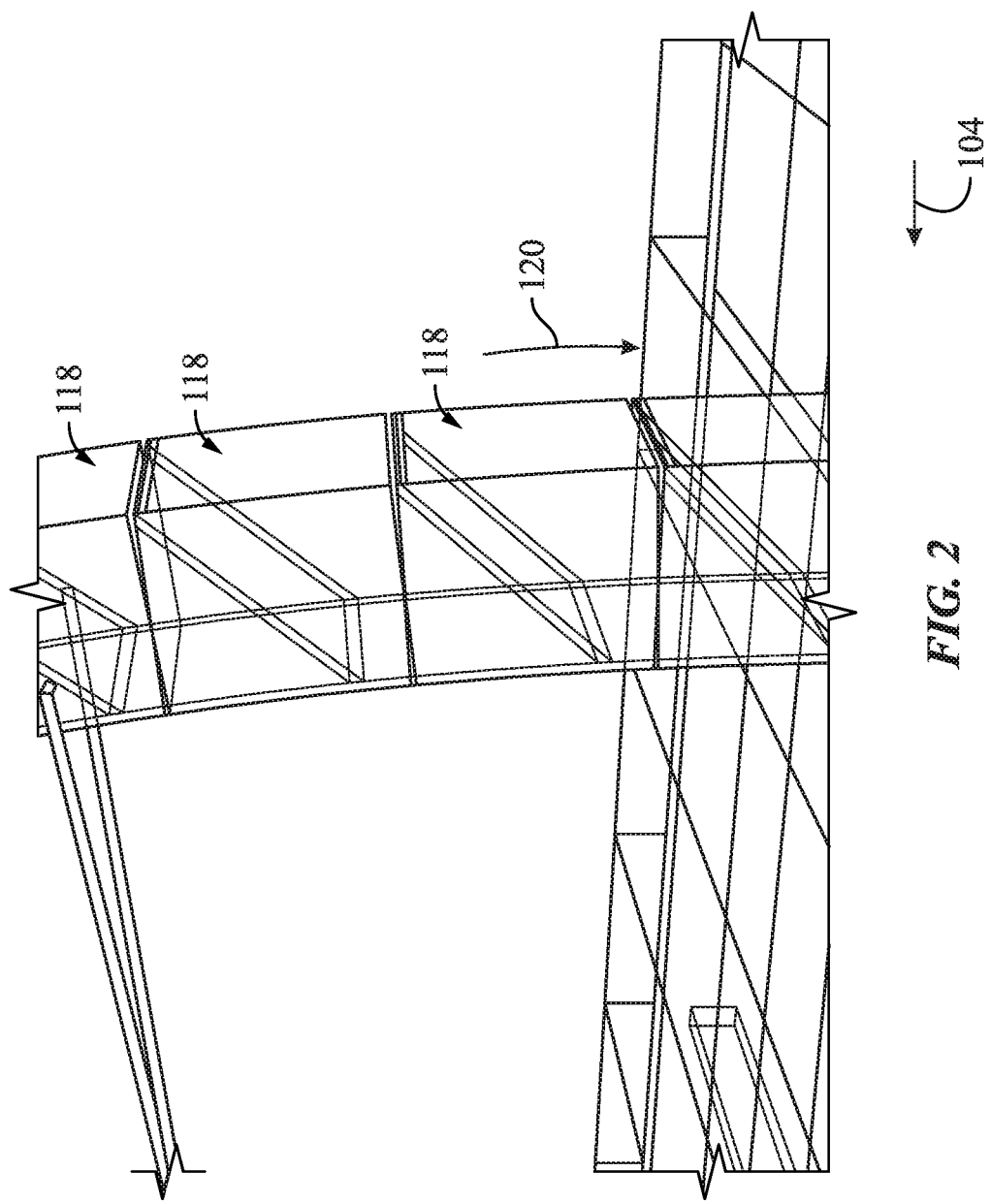
FIG. 2 is a close-up view of a portion of a when showing water scoops according to an embodiment of the present disclosure.

Wheel 150 is also constructed to be partially immersed in moving water 102, which in FIG. 1 is flowing in the direction of arrow 104, first past the first wheel 110 and then past the second wheel 150. The construction of wheel 150 in one embodiment is similar to that of wheel 110, but of a different size, as follows. Wheel 150 has a central hub 152 and a plurality of support wires or spokes 154 that extend between the central hub 152 and the outer rim 156 of the wheel 150. Outer rim 156 comprises in one embodiment a plurality of scoops 158 (similar in construction to scoops 118 as shown in FIG. 2) designed to catch water 102 therein and rotate the wheel 150 about the hub 152. Scoops 158 are shown in one configuration, but it should be understood that additional or different configurations may be used without departing from the scope of the disclosure.

In one embodiment, wheel 150 has three large beam structures 162 that extend between the outer rim 156 and the central hub 152. The beam structures 162 are spaced at substantially equal 120 degree intervals in one embodiment. The beam structures 162 provide additional stability to the wheel 150, as well as provide a support for the addition of weights 164 at the points 166 where the beam structures 162 adjoin the outer rim 156. Weights 164 in one embodiment are provided at the outer rim 156 at 120 degree spacing about the outer rim 156. In one embodiment, weights 164 are covered with a cover 165 for increased resistance to the elements and for streamlining the wheel 150.

Figure 4:
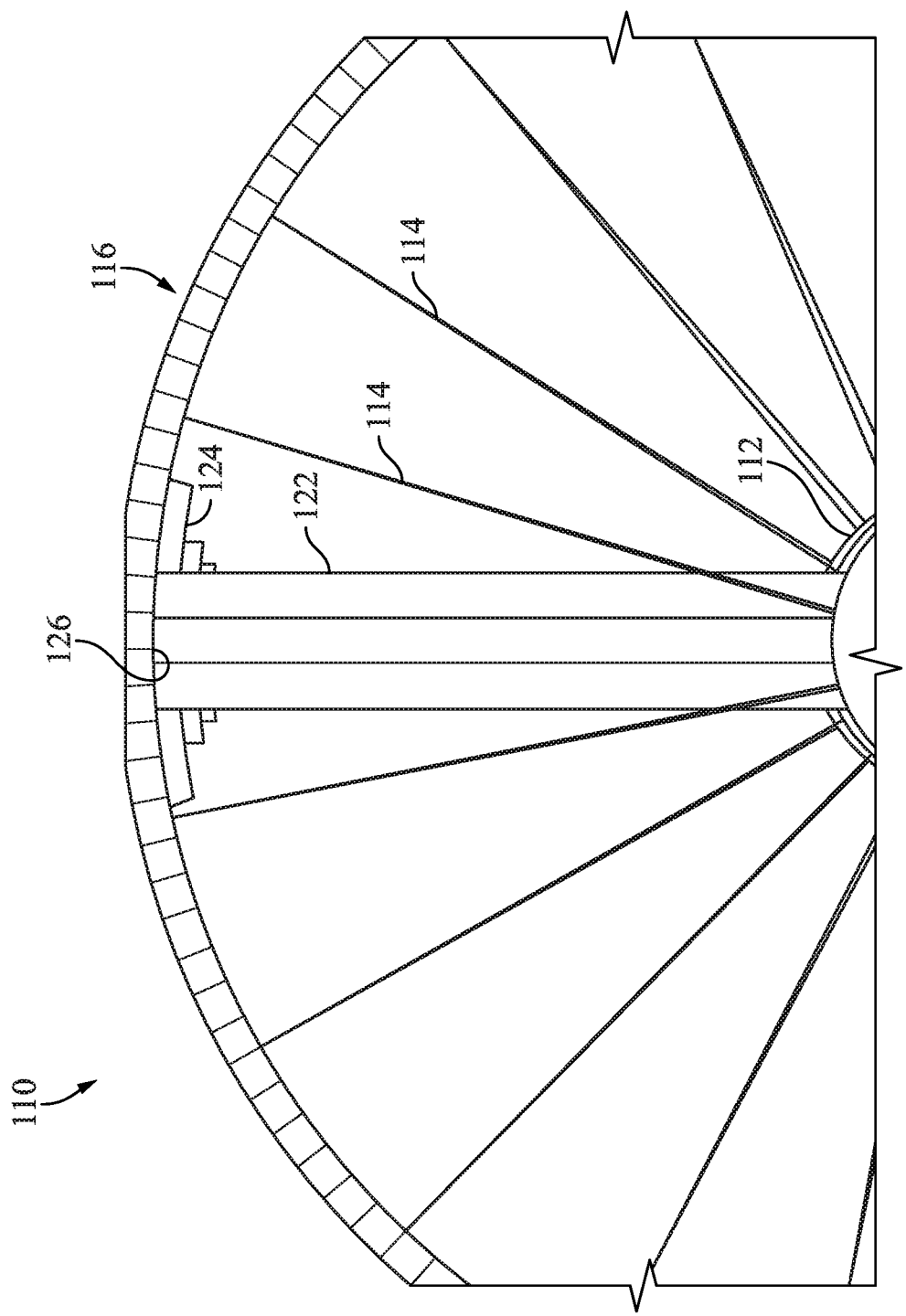
FIGS. 4-7 show views of a portion of a wheel and weight system according to an embodiment of the present disclosure.
Figure 5:
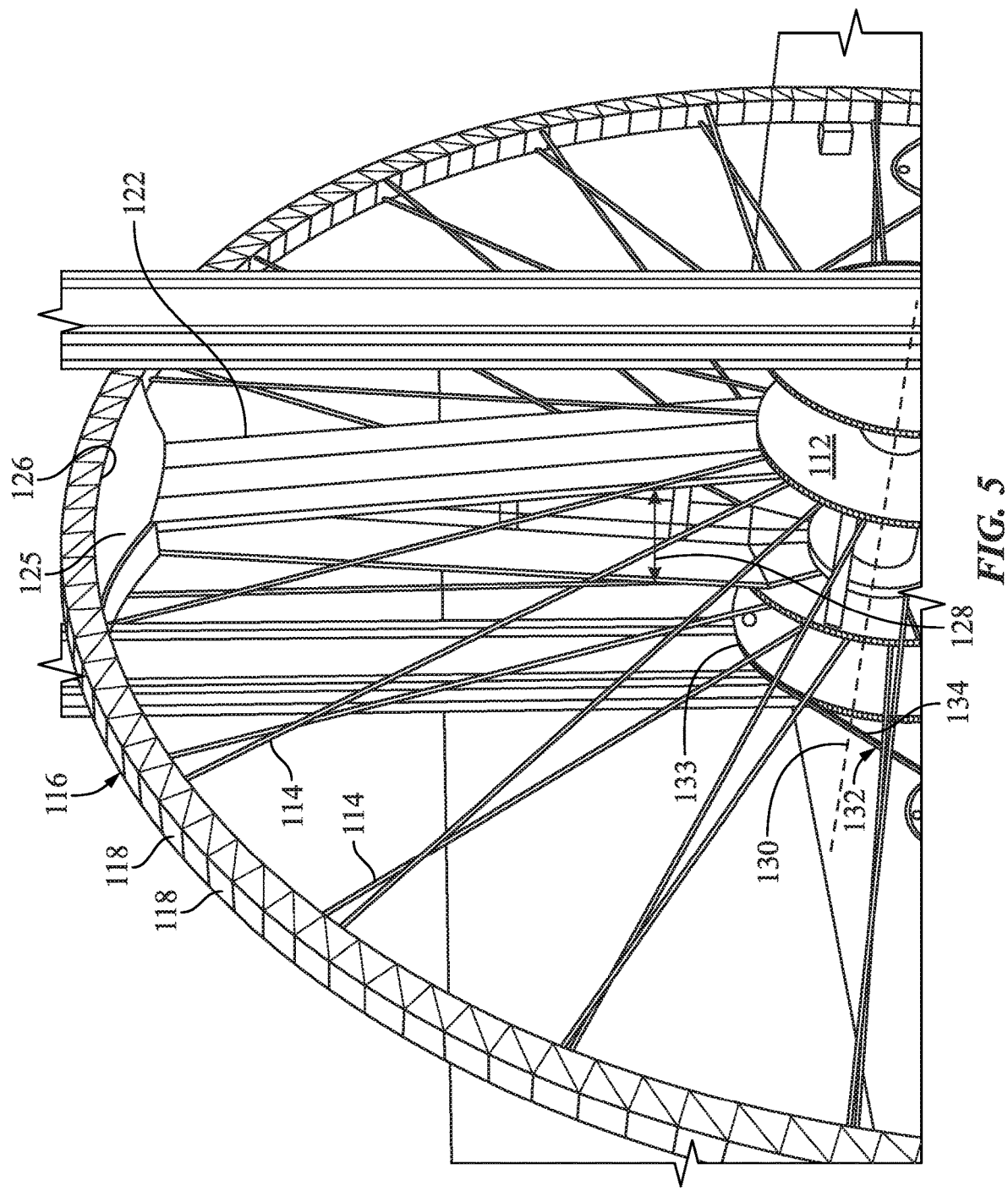
Figure 6:
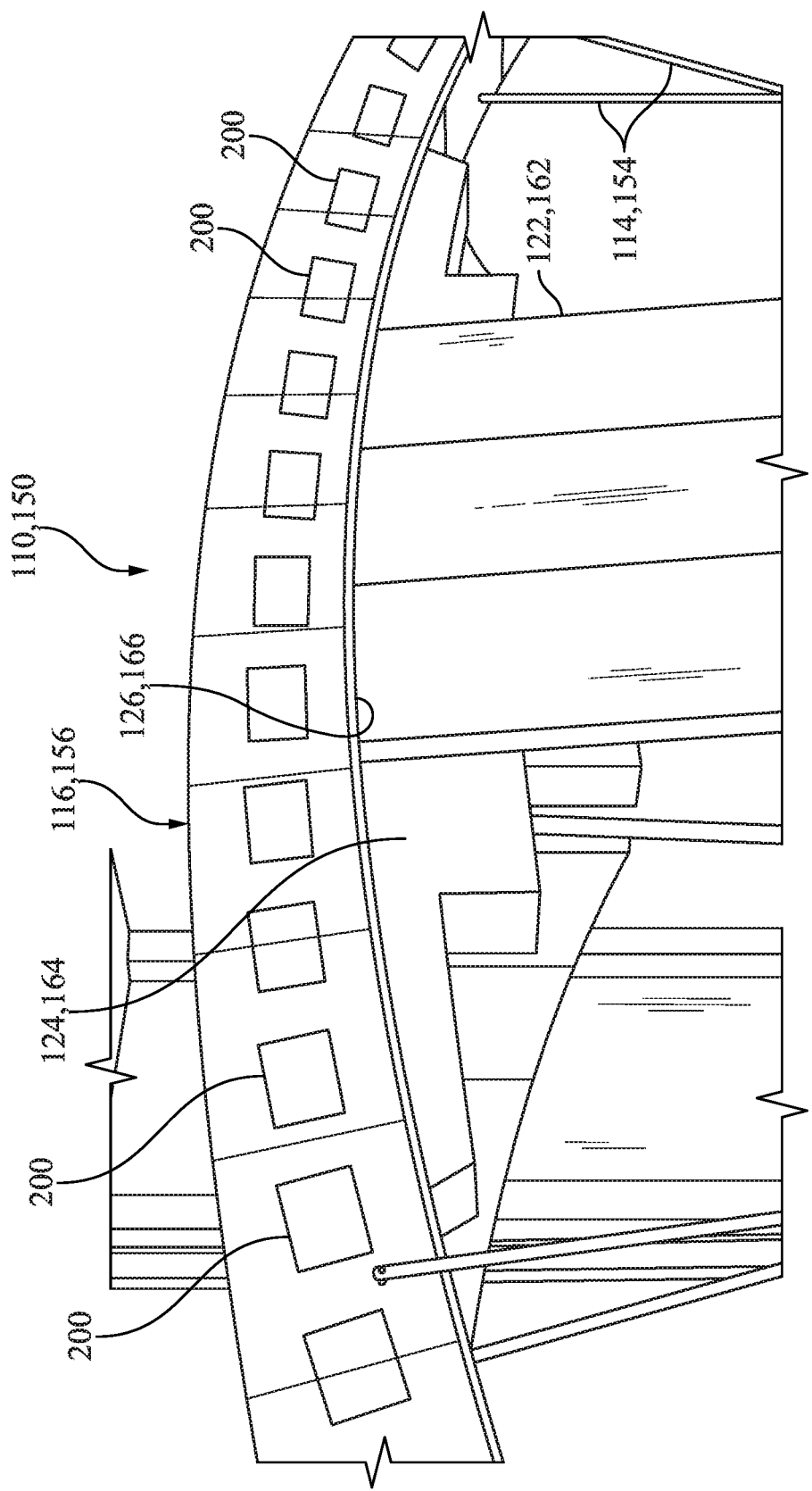
Figure 7:
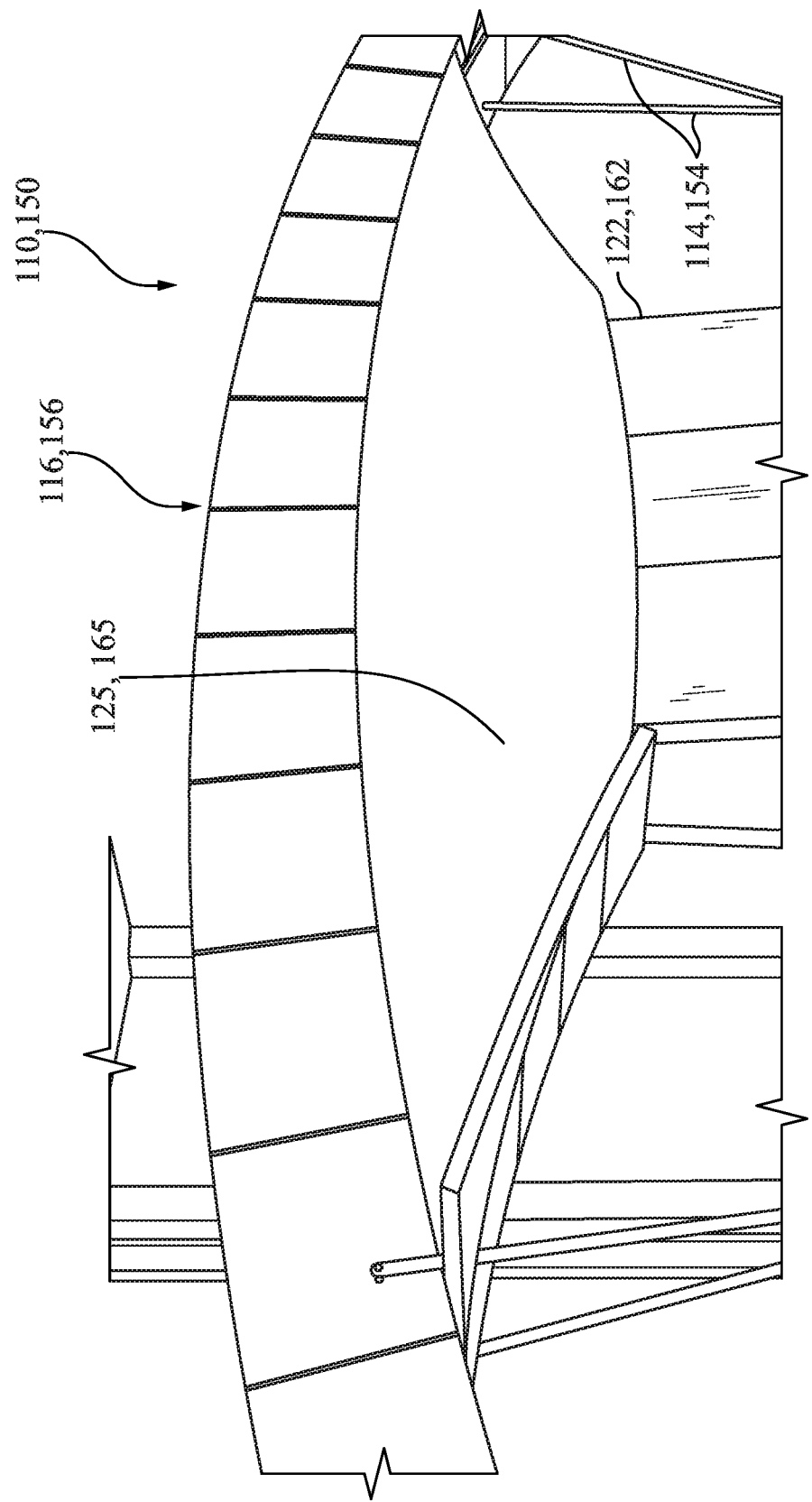

FIG. 3 is an elevation view of representative wheels 110 and 150 shown separate from the system 100. A representative view of a beam structure 122 and weights 124 shown in greater detail in FIGS. 4 and 5. FIG. 4 is a partial side elevation view of wheel 110, and FIG. 5 is a partial perspective view of wheel 110. A close-up view of representative weights 124, 164 in place on a wheel such as wheel 110, 150 is shown in FIG. 6, and a close-up view of a weight cover 125, 165 in place on a wheel such as 110, 150 is shown in FIG. 7.

Beam structure 122 in one embodiment comprises a pair of elements that extend between the hub 112 and the outer rim 116, and which are spaced apart a distance 128 along the axis of rotation 130 of hydro-magnetic wheel 110, and are angled inward toward the outer rim 116. Weights 124 are provided near the outer rim at or about the points 126. In rotation of the wheel 110, the weights being positioned at the outer rim assists in stability of the wheel, but also provides a more difficult movement of the wheel, allowing the harnessing of more energy from moving water. The weight 124 at the outer rim 116 increases the amount of energy needed to get the wheel 110 to rotate. Gravity influence on the weights of the rotating wheel 110 may also provide a small increase in the amount of energy that may be harnessed from the wheel 110.

Figure 8:
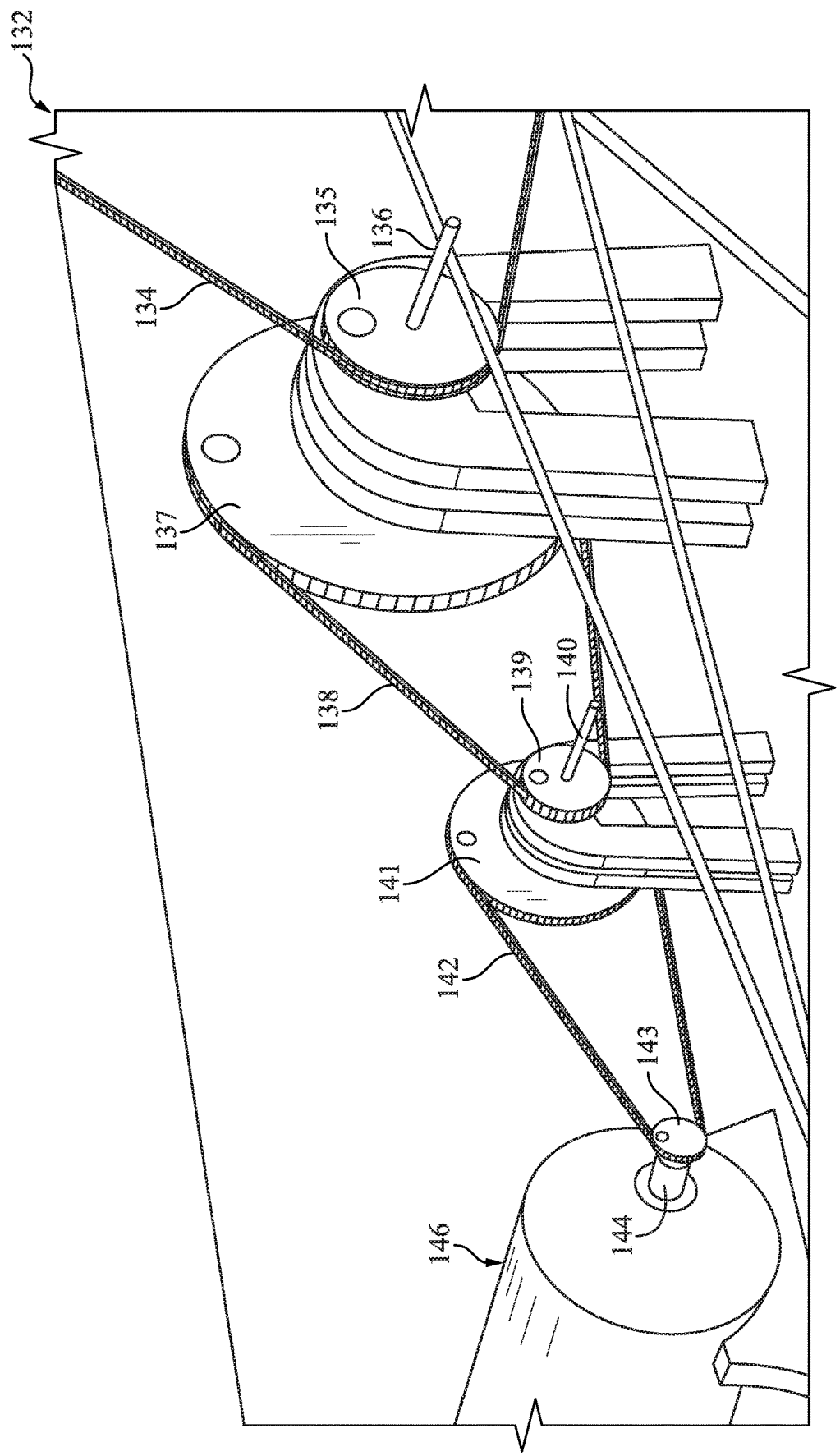
FIG. 8 is a perspective view of a pulley and belt system according to an embodiment of the present disclosure.

As shown in greater detail in FIG. 8, wheel 110 is coupled via a pulley and belt system 132 to harness energy from the rotation of the wheel 110. A pulley 133 is fixed on the center hub 112. A belt 134 is mounted around pulley 133 and another pulley 135. Pulley 135 rotates on an axis 136 along with another pulley 137. A belt 138 is mounted around pulley 137 and another pulley 139. Pulley 139 rotates on an axis 140 along with another pulley 141. A belt 142 is mounted around pulley 141 and another pulley 143. Pulley 143 rotates along with shaft 144 of a turbine 146. Turbine 146 is described in greater detail below.

Figure 9:
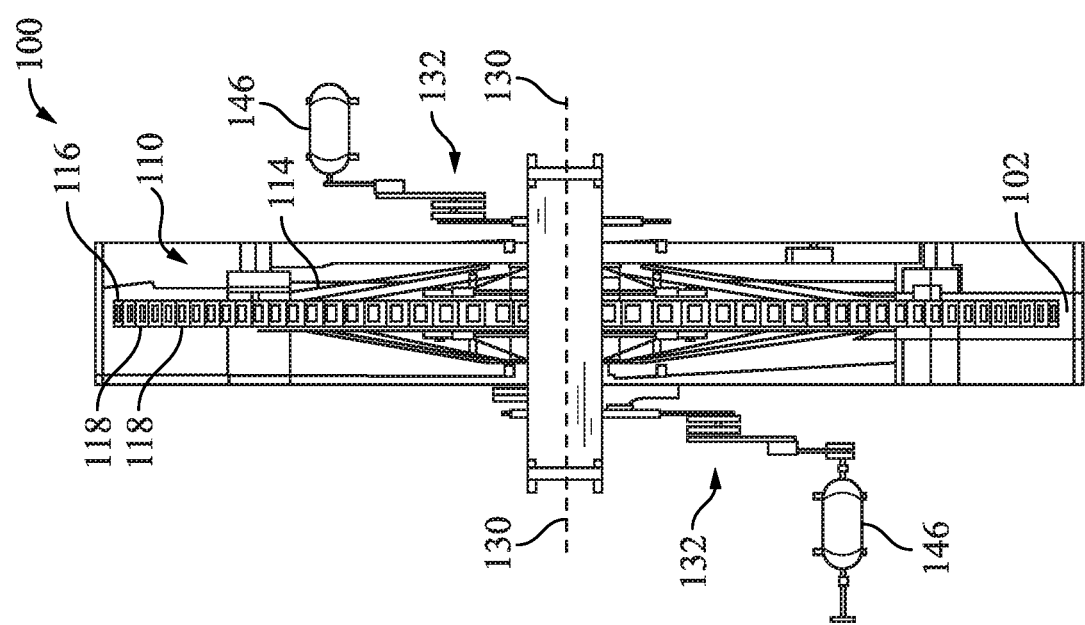
Figure 11:
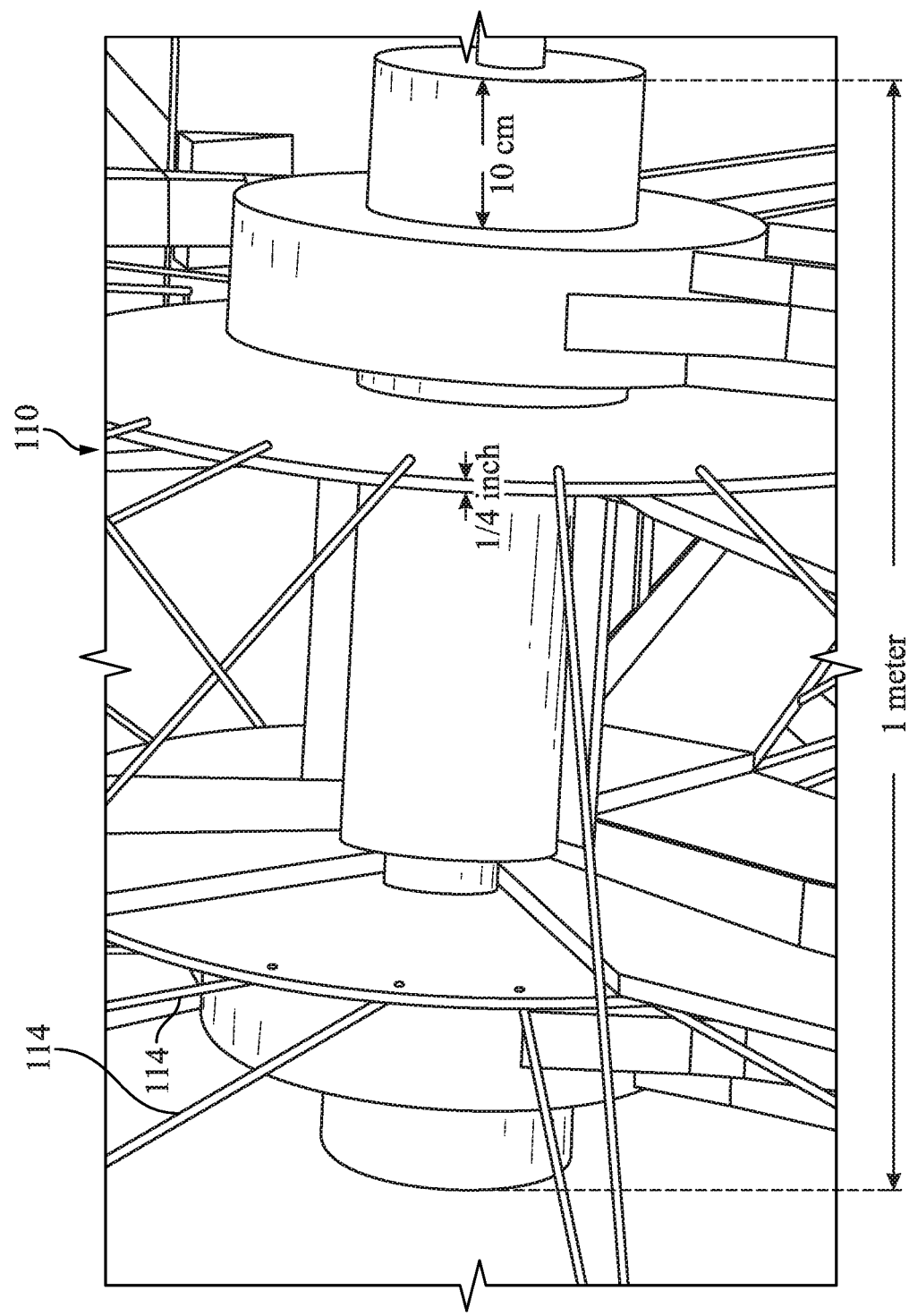
FIGS. 11-17 show additional construction details and sample measurements of a hydro-magnetic wheel according to a representative embodiment of the present disclosure.
Figure 12:
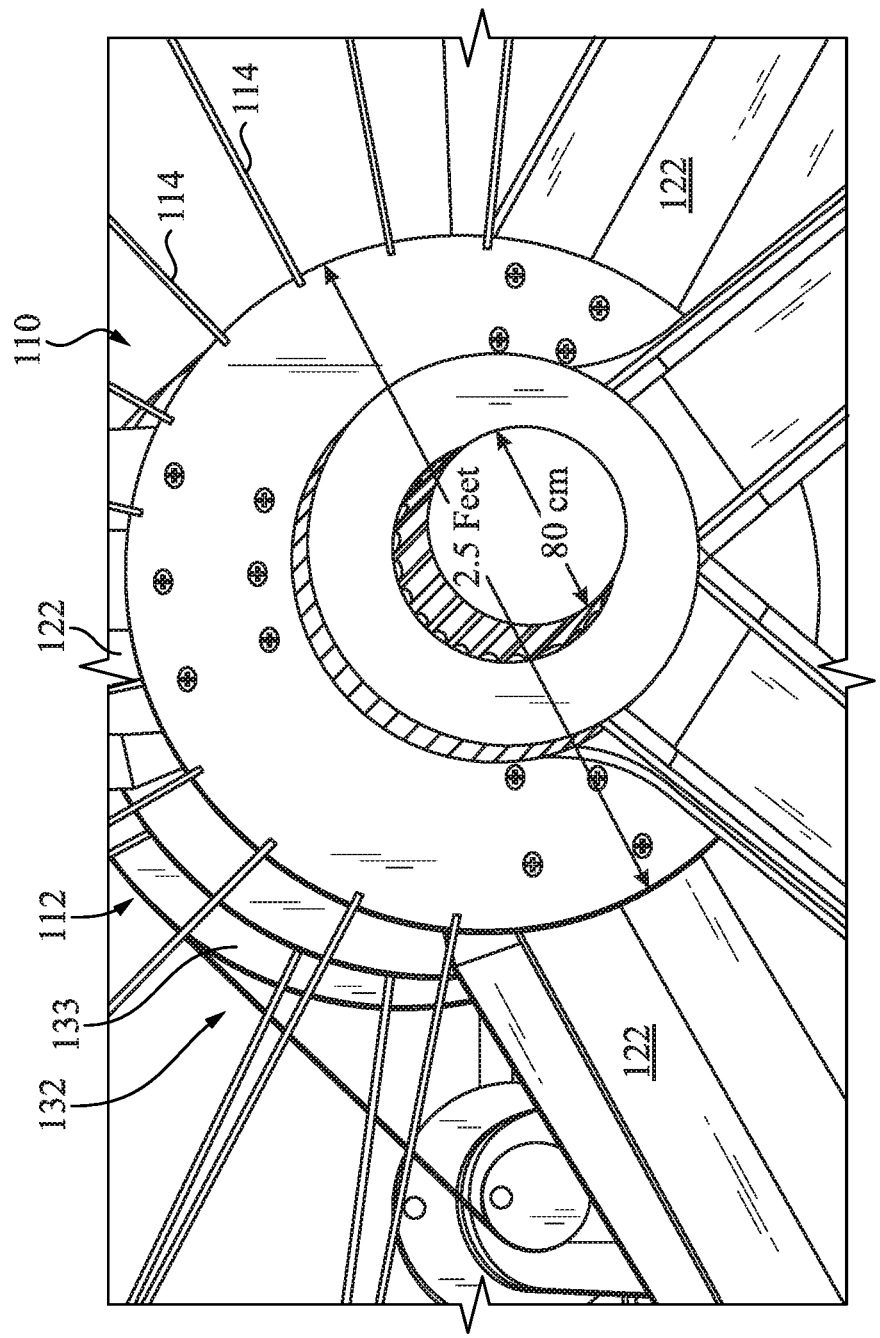
Figure 13:
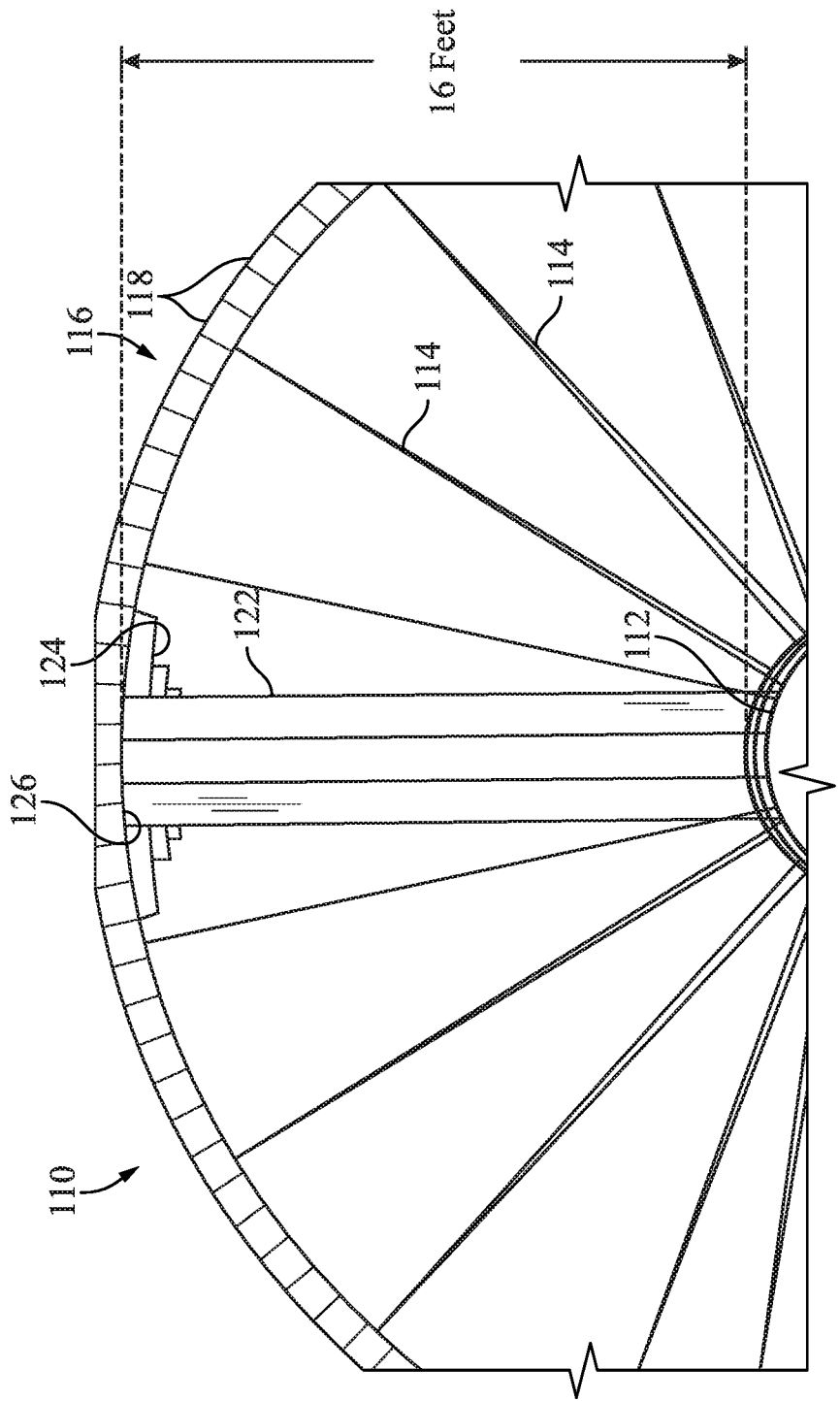
Figure 14:
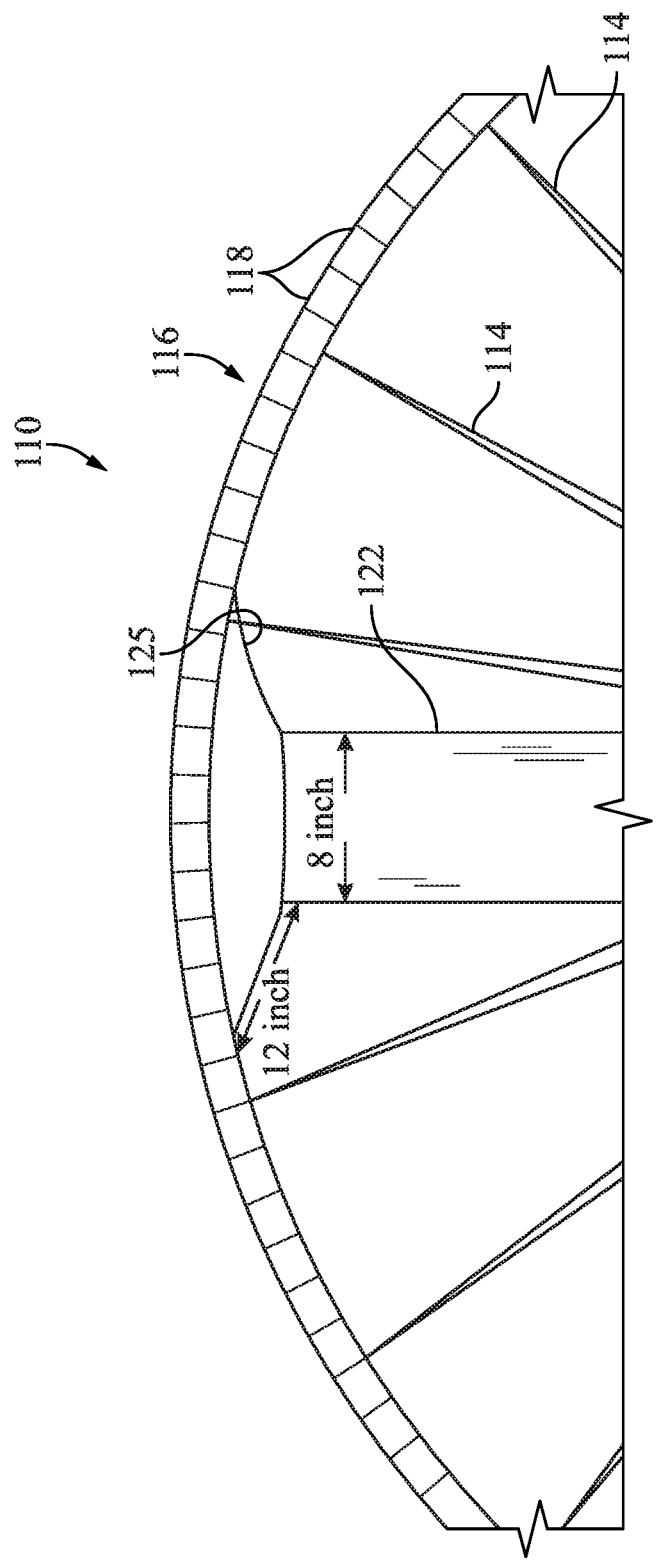
Figure 15:
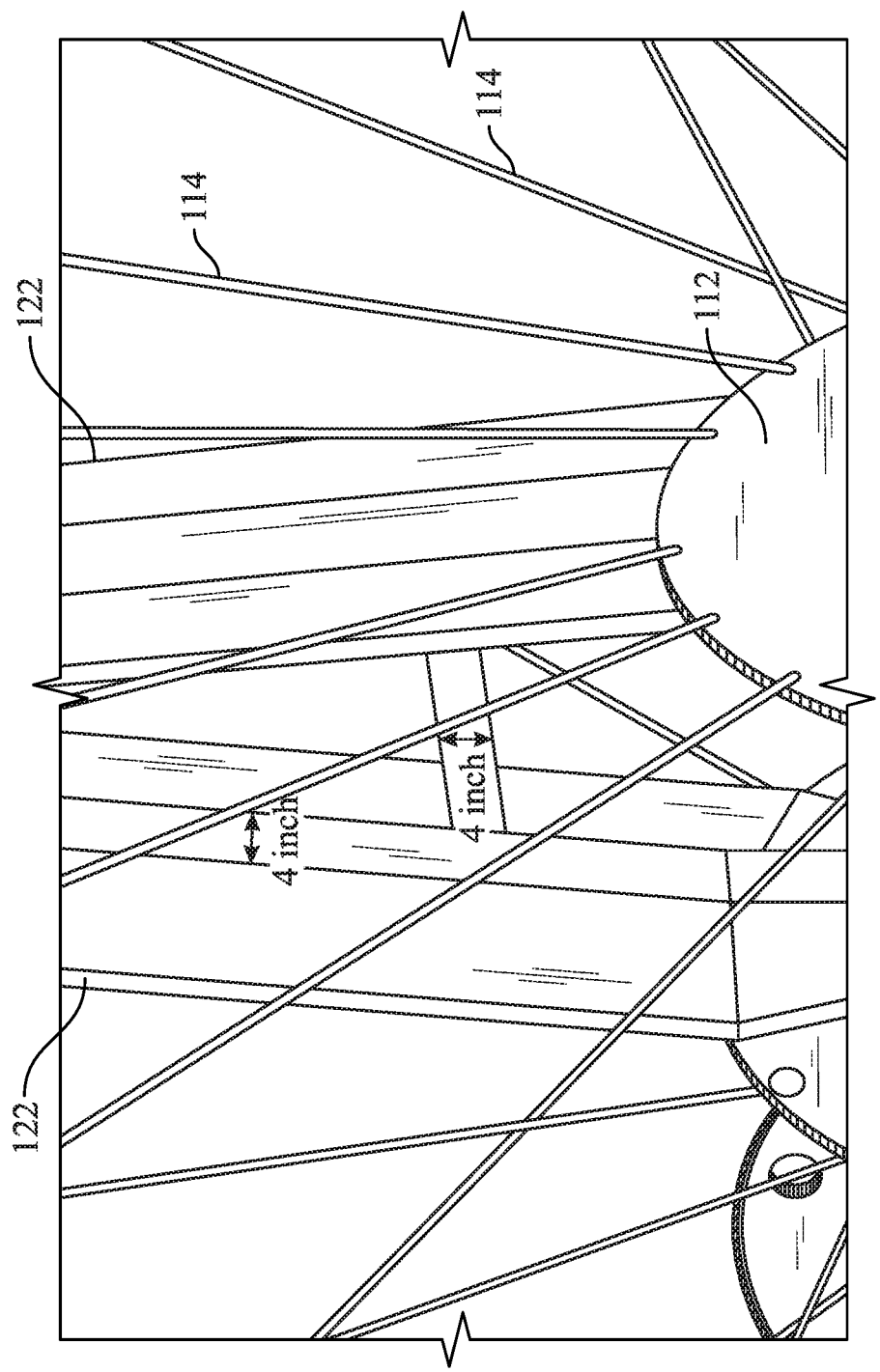
Figure 17:
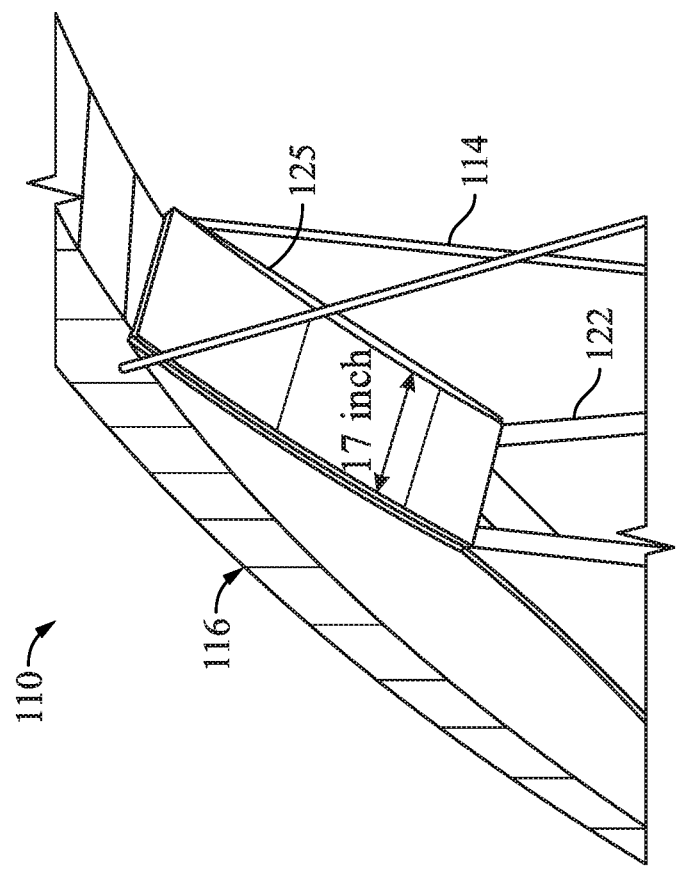

Pulley 133 is larger in diameter than pulley 135, so each rotation of pulley 133 translates to a greater rotational speed of pulley 135. Pulley 137 is larger in diameter than pulley 139, so each rotation of pulley 137 translates to a greater rotational speed of pulley 139. Pulley 141 is larger in diameter than pulley 143, so each rotation of pulley 141 translates to a greater rotational speed of pulley 143. This translation of speed of rotation from the largest pulley 133 to the smallest pulley 143 makes the rotational speed of pulley 143 much greater in revolutions per minute than the rotation of the wheel 110. Pulley sizes may be chosen in one embodiment to effect a desired rotational speed of the pulley 143, and therefore of shaft 144 of turbine 146. The two pulleys on each shaft allows for an even greater increase in rotational speed of the pulley 143 than a simple translation from pulley 133 to pulley 143 with a single belt. It should be understood that a larger or smaller number of pulleys and belts may be used without departing from the scope of the disclosure. As shown in top view in FIG. 9, a pair of pulley and belt systems 132 may be used for hydro-magnetic wheel 110, one on each side of the hydro-magnetic wheel 110, to harness energy to turbines 146.

Similar to the beam structures 122 of wheel 110, in one embodiment, wheel 150 also has three large beam structures 162 that extend between the outer rim 156 and the central hub 152. The beam structures 162 are spaced at substantially equal 120 degree intervals in one embodiment. The beam structures 162 provide additional stability to the hydro-magnetic wheel 150, as well as provide a support for the addition of weights 164 at the points 166 where the beam structures 162 adjoin the outer rim 156. Weights 164 in one embodiment are provided at the outer rim 156 at 120 degree spacing about the outer rim. A belt and pulley system 172 may be used in one embodiment to power turbine 196.

Figure 10:
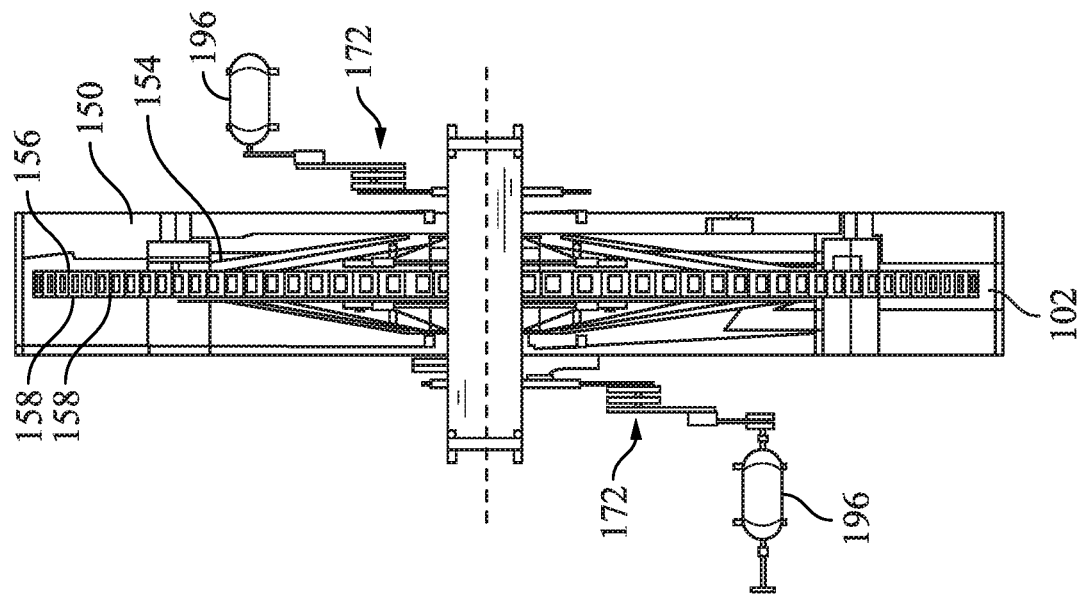
FIGS. 9-10 are top views of wheels and turbines according to an embodiment of the present disclosure.

While the sizes of the wheel 150 and its components are different in one embodiment than the components of wheel 110, the structure is similar, and aside from the numbering of the beam structures 122 and belt and pulley system 172, the components are similar. It should be understood that the ratios of size of pulleys in the belt and pulley system 172 may be the same or may be different from those of system 132 without departing from the scope of the disclosure. The representative view of the beam structure 122 and weights 124 shown in greater detail in FIGS. 3-7, as well as the pulley and belt structure 132, therefore applies as well to that of the beam structures 162 of wheel 150, and of the pulley and belt system 172 of wheel 150. As shown in top view in FIG. 10, a pair of pulley and belt systems 172 may be used for wheel 150, one on each side of the c wheel 150, to harness energy from the wheel 150 to turbine(s) 196.

In one embodiment, the turbines 146 are connected to the wheel 110 to convert the kinetic energy of the rotating wheel 110 to electrical energy. This is accomplished in a traditional turbine 146 or turbines 146 with a rotating shaft or shafts 144 in known fashion. In this embodiment, the wheel 150 is also connected to turbine or turbines 196 to power them.

FIGS. 11-17 show representative sample measurements for one embodiment of a wheel 110. While the measurements are shown and are representative of sizes for a 16 foot radius wheel 110, it should be understood that the actual dimensions of the wheel 110, and wheel 150, may be modified without departing form the scope of the disclosure.

Figure 18:
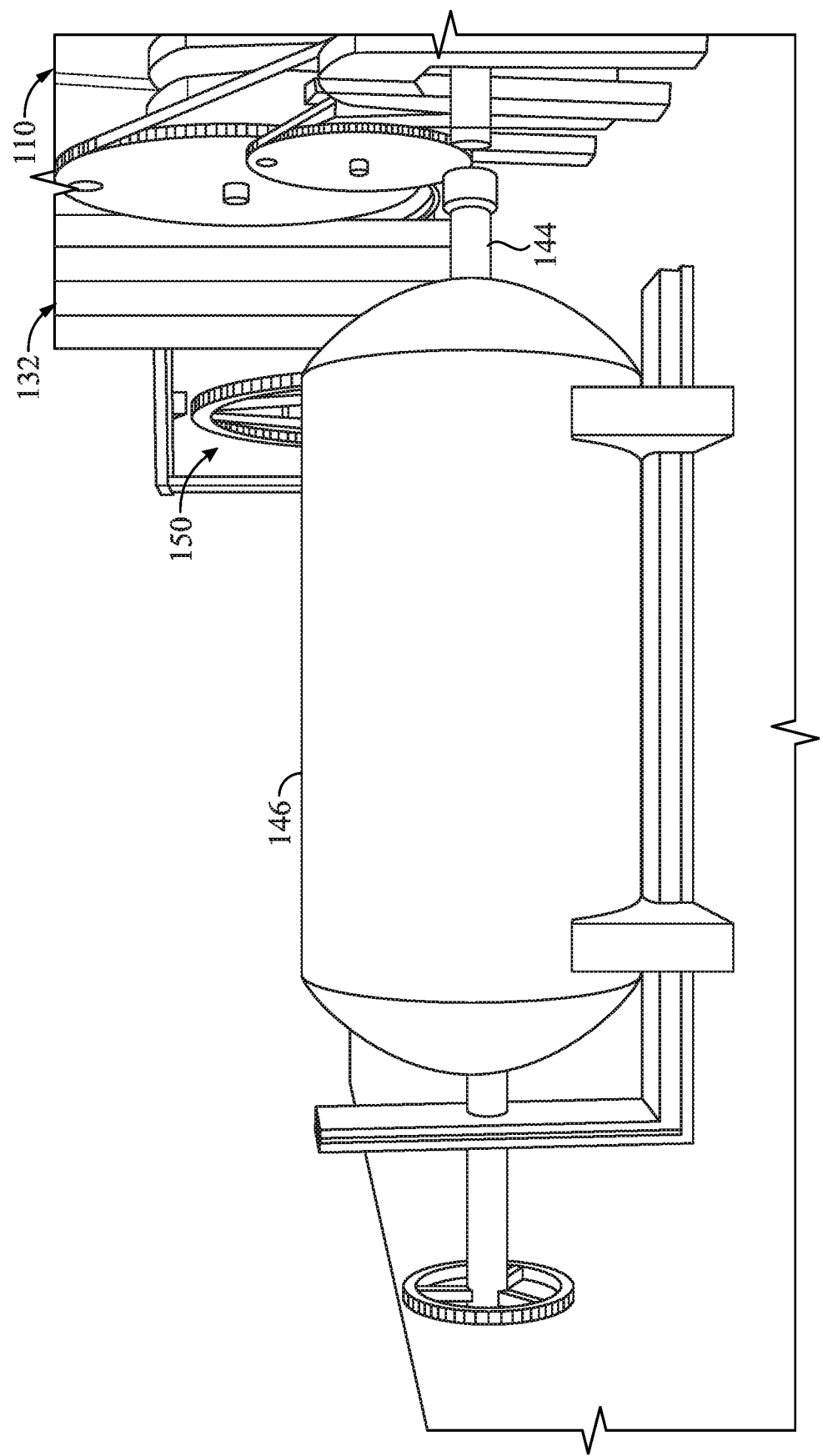
FIG. 18 is a perspective view of a turbine configuration according to an embodiment of the present disclosure.
Figure 19:
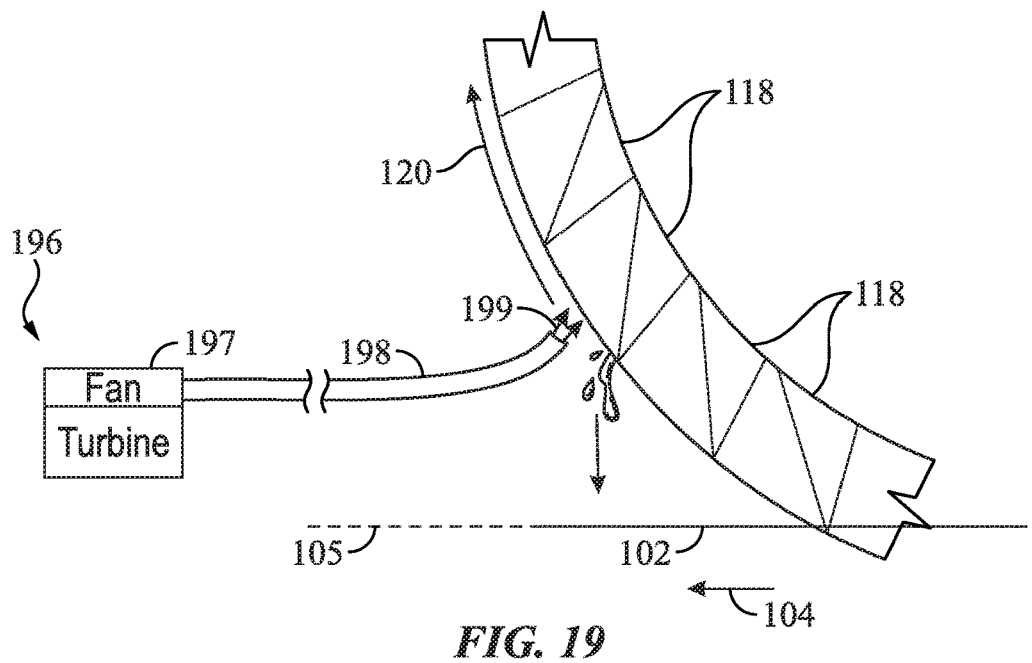
FIG. 19 is a diagrammatic view of an air blower fan and turbine according to an embodiment of the present disclosure.

Power system 100 comprises in one embodiment two wheels. Each wheel 110, 150 is constructed in the same way with each wheel having its own function. Wheel 110 in one embodiment is used to generate electricity at turbine(s) 146 from its rotation, as described above and also as shown in FIG. 18. Wheel 150 is used with turbine(s) 196 to provide power for a blower fan or fans 197 as shown in FIG. 19. The blower fan 197 is coupled to an air hose, air conduit, or pipe 198 that is routed in one embodiment to blow air 199 at passing scoops 118 of wheel 110 above a water level 105 of flowing water 102 to aid in the removal of water from the scoops as they pass the blown air 199, and to provide additional impetus for rotation of the wheel 110. In another embodiment, another air hose or pipe (not shown) provides blown air from the blower fan 197 to scoops 158 of wheel 150.

Figure 16:
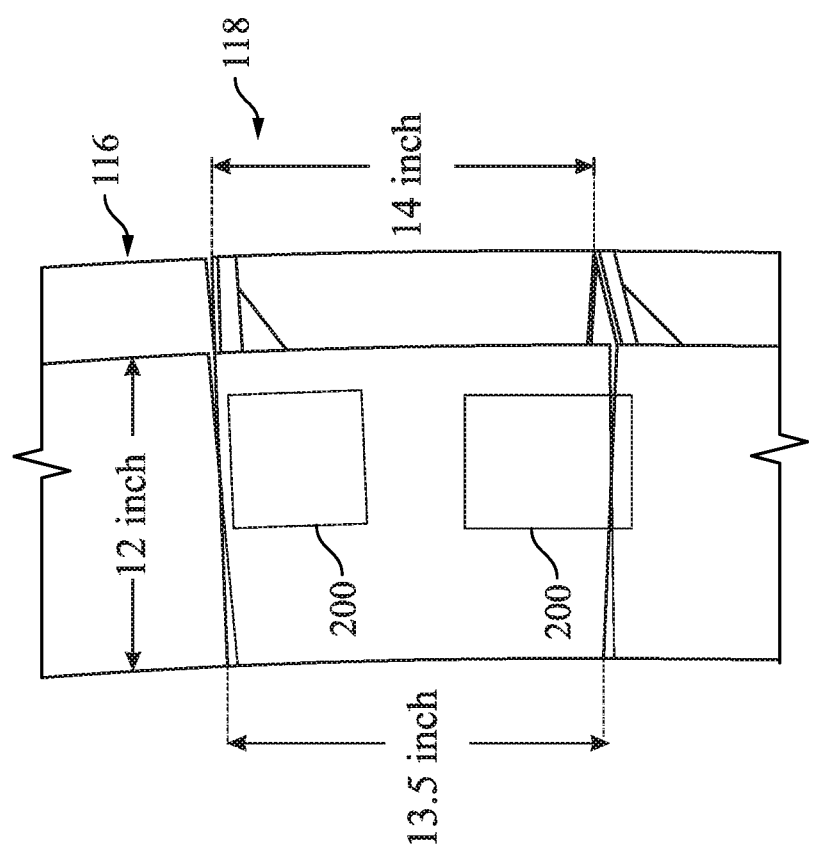
Figure 20:
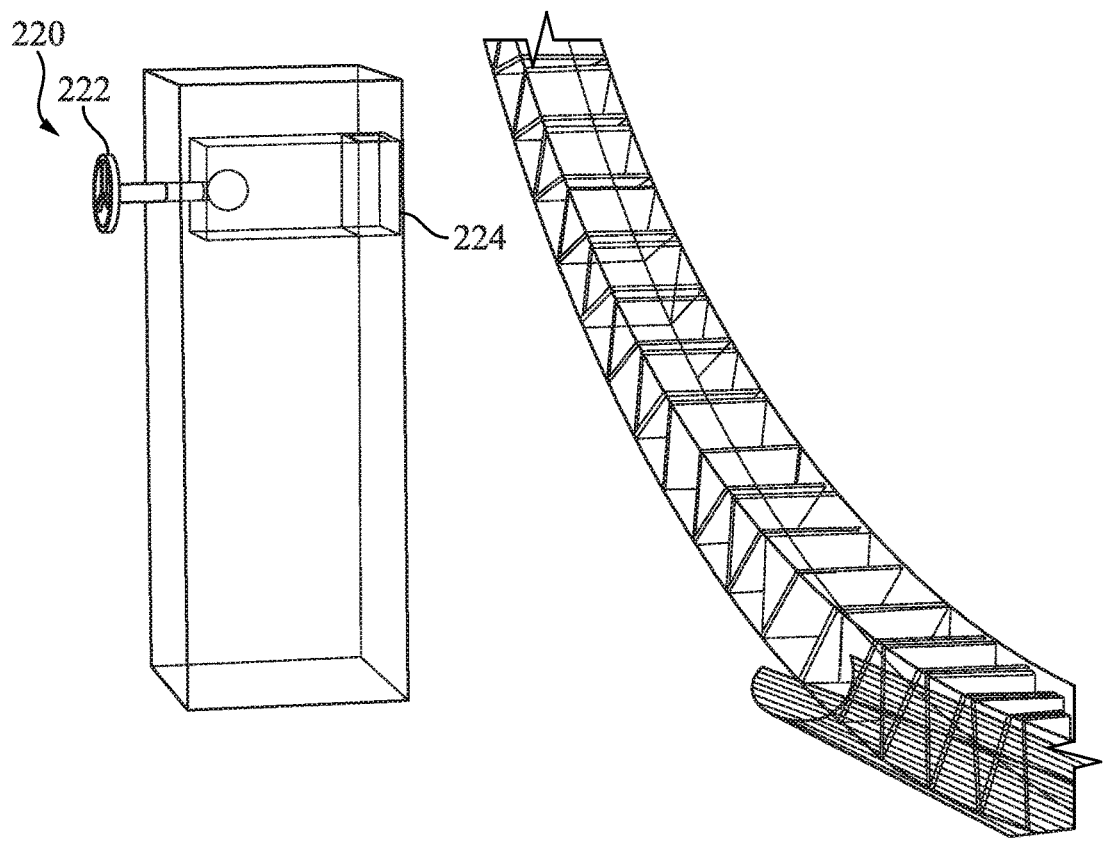
FIGS. 20-21 are views of a magnetic brake according to an embodiment of the present disclosure.
Figure 21:
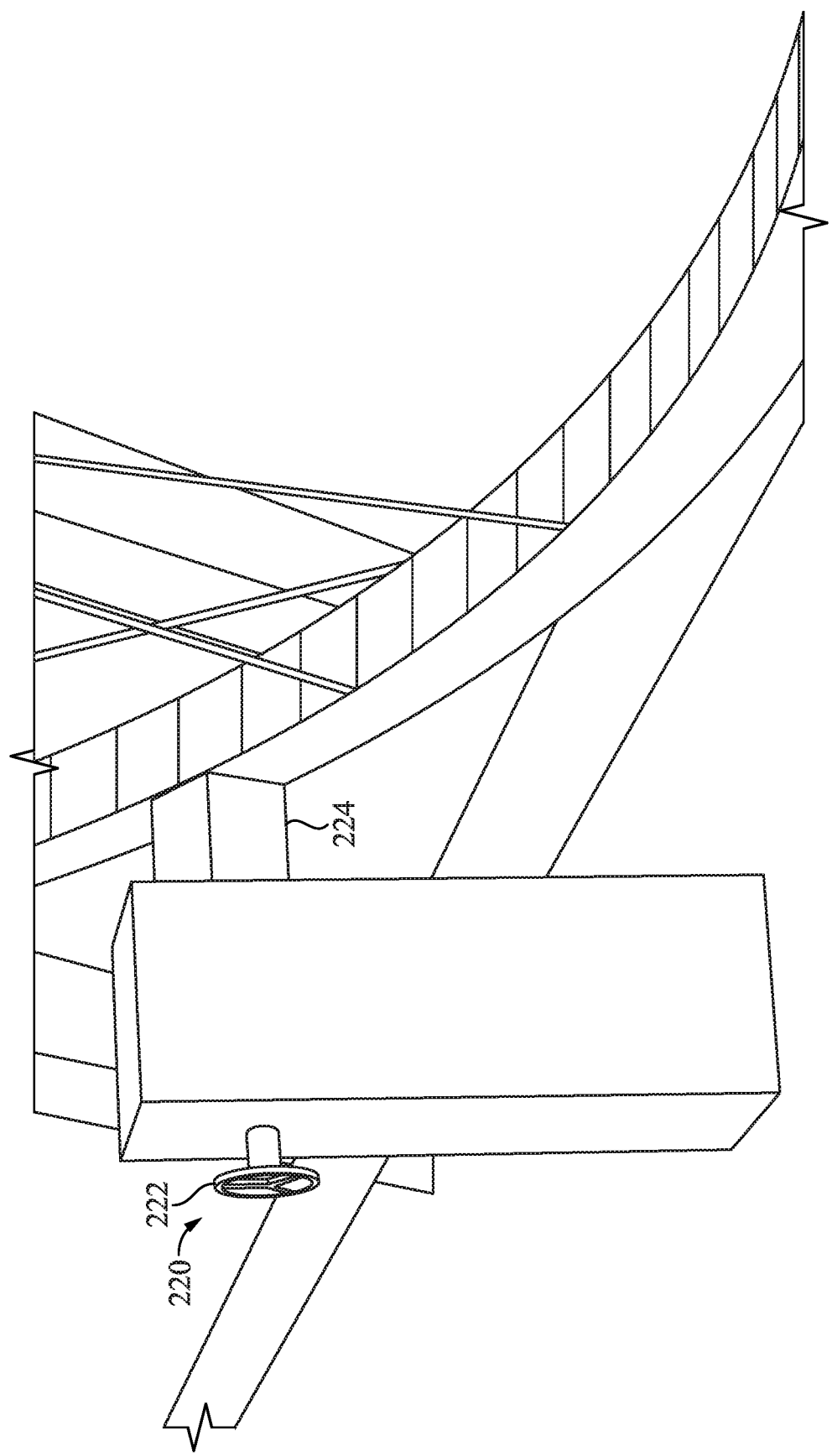

Another component of system 100 in one embodiment provides a plurality of magnets 200 that are arranged on a peripheral edge of the rim 116 of wheel 110 (see FIGS. 6, 16, for example). The magnets are arranged in a configuration and used in conjunction with an additional stationary magnet or magnets (e.g., a magnetic driver) to assist in rotation of the wheel 110, which may be referred to in this embodiment as a hydro-magnetic wheel. In one embodiment, approximately 150 magnets are arranged on wheel 110 and attached by fasteners such as screws and/or fiberglass resin. The stationary magnet in one embodiment is mounted to frame 111. Additional magnetic drivers may be used without departing from the scope of the disclosure. Still further, as shown in FIGS. 20-21, a mechanically actuated magnetic brake 220 may be used in another embodiment to engage magnets 200 to slow or stop rotational motion of the wheel 110. Magnetic brake 220 comprises in one embodiment a turnable wheel 222 that when turned extends or retracts a braking magnet 224 toward or away from the wheel 110 magnets 200. FIG. 20 shows the brake 220 in its retracted position, and FIG. 21 shows the brake 220 in its extended position. The sizes of the magnets will be different depending upon the dimensions of the wheel 110.

Figure 22:
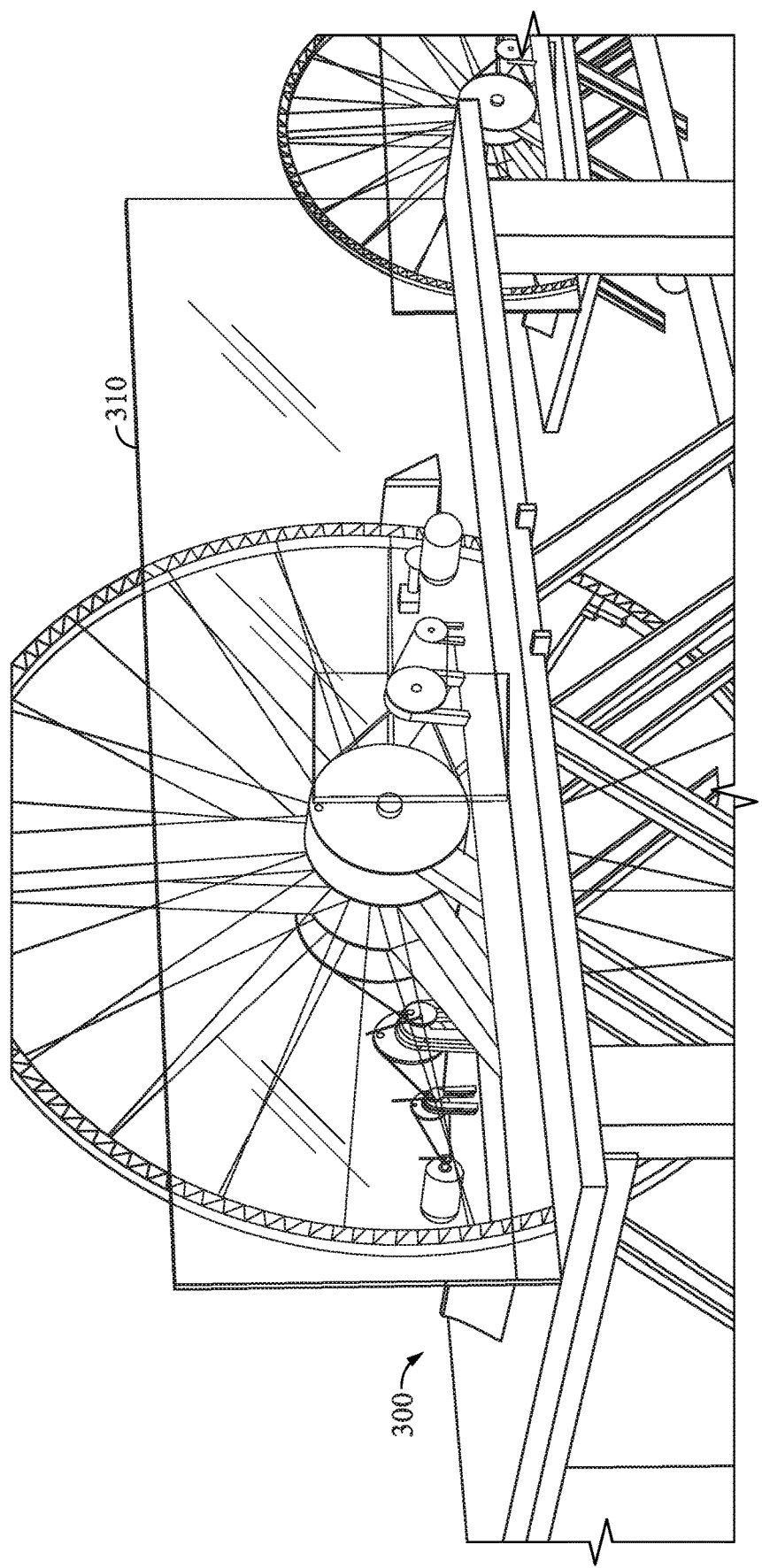
FIGS. 22-23 are perspective views of enclosures and/or safety barriers according to embodiments of the present disclosure.

In one embodiment, shown in perspective view in FIG. 22, a platform 300 may be built on which the turbines and pulley and belt systems of wheel 110 are mounted. Another platform 302 may be built on which the turbines and pulley and belt systems of wheel 150 are mounted. In one embodiment, a safety barrier such as safety glass 310 may be erected to provide a barrier between the system 100 and the environment. While safety glass is discussed, it should be understood that different material may be used without departing from the scope of the disclosure.

Figure 23:
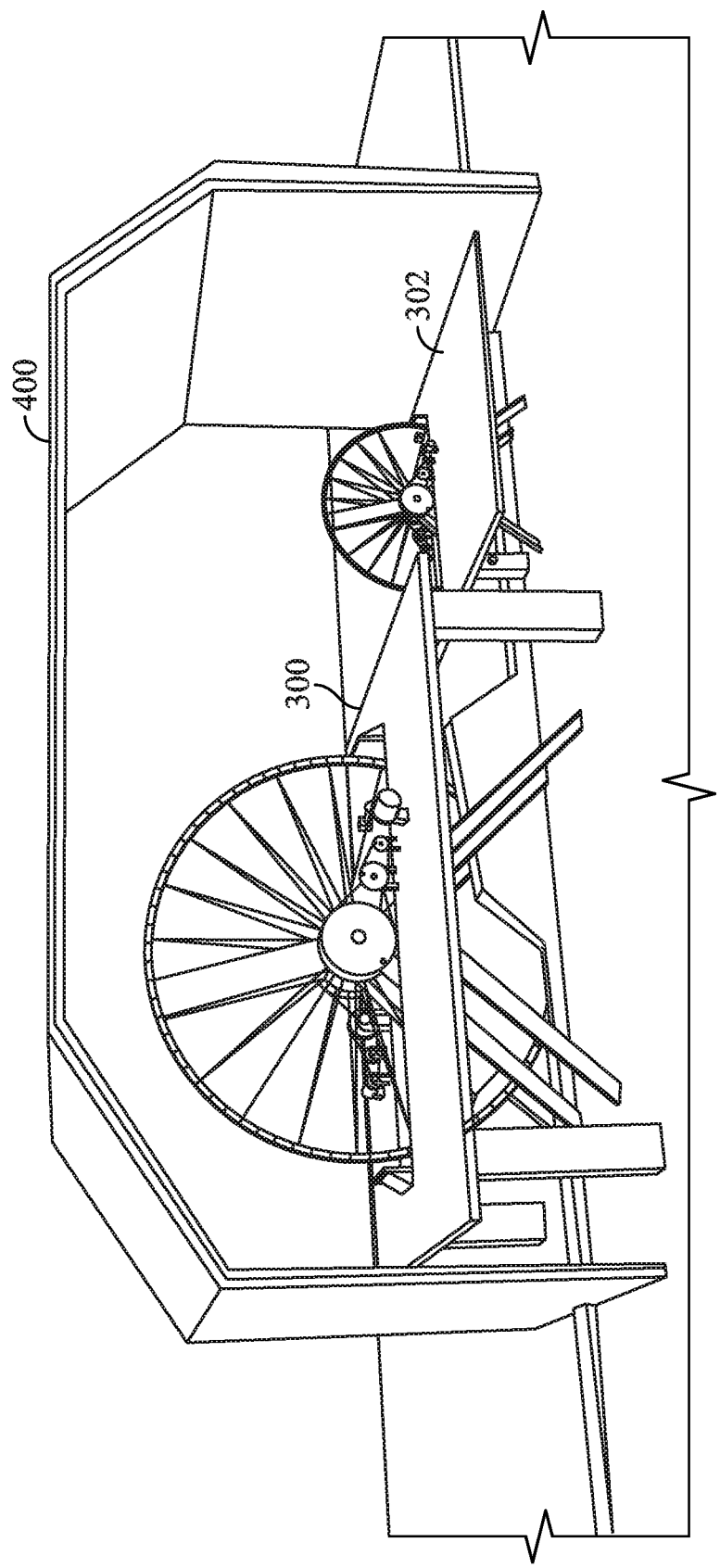

Alternatively, as shown in FIG. 23, a structure such as building 400 may be erected around and enclosing, either partially or entirely, those positions of the system 100 that would otherwise be exposed to the elements. This building may be used instead of or in conjunction with the platforms 300 and 302.

Figure 24:
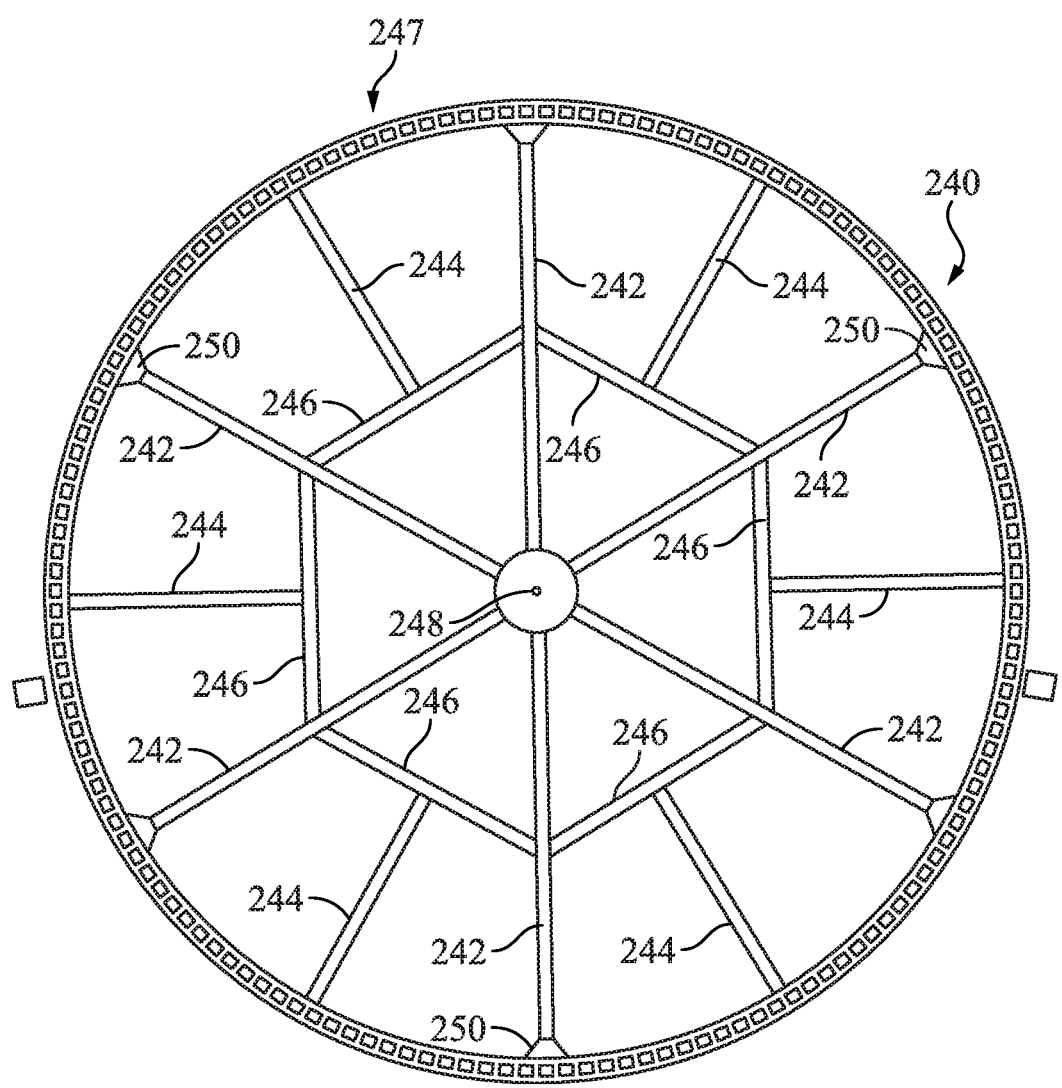
FIG. 24 is an elevation view of an alternate wheel according to an embodiment of the present disclosure.

FIG. 24 illustrates a hydro-magnetic wheel 240 according to another embodiment of the present disclosure. Wheel 240 is similar in construction to that of wheels 110 and 150. Wheel 240 is constructed using more rigid support beams 242 than the support wires 114, 154 of wheels 110, 150. In one embodiment, rigid support beams are constructed of a metal such as galvanized steel. Beams 242 may have a circular cross section, a rectangular cross-section, or may be bended flat portions of metal, such as an L or V shape, or the like, without departing from the scope of the disclosure. In one embodiment, six beams 242 extend from an exterior circumference 247 of the wheel 240 to a central hub 248 of the wheel 240. The six beams 242 are spaced evenly about the wheel 240 at substantially equal angles. A series of six secondary beams 244 extend between the circumference 247 of wheel 240 and tertiary beams 246. The tertiary beams 246 extend between adjacent beams 242 to provide support therebetween. In one embodiment, three of the beams 246 have weights 250 positioned at or near the circumferential edge 247 of the wheel 240.

Wheel 240 outer section 249, such as that around the circumference 247, in one embodiment comprises a lightweight material core and a reinforcing exterior, such as but not limited to Styrofoam covered with a layer or layers of fiberglass. This type of outer construction provides a lighter spun weight of the wheel 240 to allow water of other flowing fluid to more easily move the wheel 240. While Styrofoam and fiberglass are indicated as potential materials, it should be understood that for wheels of a certain size and power, such materials may not be sufficient. Accordingly, stainless steel or aluminum wheel components are utilized in one embodiment. In a stainless steel embodiment, magnets are not used.

Embodiments of the present disclosure therefore provide a combination of elements and components that are used in combination to provide an easy to use and assemble power generating system. The rotation of the wheels 110, 150, the arrangement of magnets 200, the air blower from the wheel 150 to assist in motion and removal of water from wheel(s) 110, 150, the pulley and belt system to increase revolutions for the turbines 146, 196, and the weights on the outer rim 116 all combine to provide system 100 that does not rely on any one of the systems by itself to provide the electrical power. Instead, the combination system increases the efficiencies through the combination. Note that for efficiency, in one embodiment, a belt such as those described herein connecting a center hub and a turbine is made as short as possible. In one embodiment, central hub(s) are placed at or near ground level to accomplish this.

Harnessing the energy of a combination of energy generating functions provides a system 100 capable of being installed and operated with a small amount of infrastructure, and in areas where the provision of electricity through traditional methods is difficult or impossible.

While system 100 is shown with two water wheels 110 and 150, it should be understood that more or fewer hydro-magnetic wheels may be used without departing from the scope of the disclosure. For example, with more than two water wheels, generated energy may be used to power a turbine such as turbine 196 to blow air into the scoops of more than one hydro-magnetic wheel to aid in removal of water from the scoops thereof.

In one embodiment, flowing water is used as a source for the wheels. As long as flowing water is at a sufficient rate, the method by which the flowing water is provided may vary. For example, however flowing water is provided, as long as it flows at a sufficient rate, electricity is provided. For example, water may be directed from a flow to a pool or reservoir, and piping at a low point may provide water under pressure and at a sufficient flow rate to provide electricity. Further, in some instances, water may be pumped to a higher elevation than it is at, even using electricity generated by original flowing water, into a pool or reservoir, which will then be used to generate sufficient flow rate for desired electricity. A dam may be used in one embodiment to provide suitable pool or reservoir or pressure for the operation of the power system.

What is claimed is:

1. A power system, comprising:
a first wheel coupled to a first generator, the first wheel comprising a first central hub on a first central axis, and a first plurality of water scoops arranged at a radial distance from the central hub, the first plurality of water scoops arranged to engage a water source to turn the first wheel on the first central hub about the first central axis, the first wheel having a first plurality of weights arranged substantially equally spaced about a circumferential portion of the first wheel;
a second wheel coupled to a second generator, the second wheel comprising a second central hub on a second central axis, and a second plurality of water scoops arranged to engage the water source to turn the second wheel about the second central axis, the second wheel having a plurality of weights arranged substantially equally spaced about a circumferential portion of the second wheel; and
an air conduit coupled to the blower of the second generator to receive blown air from the blower and to blow air through the conduit into the plurality of water scoops of the first and of the second wheels.

2. The power system of claim 1, wherein the circumferential portions of the first and the second wheels each comprise a core and a reinforcing exterior.

3. The power system of claim 1, wherein each plurality of weights is arranged on supporting spokes of its respective wheel.

4. The power system of claim 1, wherein the first plurality of weights comprises three weights.

5. The power system of claim 1, wherein the second plurality of weights comprises three weights.

6. The power system of claim 1, and further comprising:
a first plurality of magnets arranged on the circumferential portion of the first wheel, and at least a first magnetic driver arranged to engage the first plurality of magnets as the first wheel rotates about the first central axis.

7. The power system of claim 1, and further comprising:
a second plurality of magnets arranged on the circumferential portion of the second wheel, and at least a second magnetic driver arranged to engage the second plurality of magnets as the second wheel rotates about the second central axis.

8. The power system of claim 1, wherein the wheel comprises aluminum.

9. The power system of claim 1, wherein the wheel comprises stainless steel.

10. The power system of claim 1, wherein the first wheel comprises a plurality of spokes, each spoke extending from the central hub to the circumferential portion.

11. The power system of claim 10, wherein each of the plurality of spokes comprises a weight of the first plurality of weights positioned at the circumferential portion.

12. A method of providing electric power, comprising:
positioning a first wheel in a source of flowing water, the first wheel comprising a first central hub on a first central axis, and first plurality of water scoops arranged at a radial distance from the central hub, the first plurality of water scoops arranged to engage the source of flowing water to turn the first wheel on the first central hub about the first central axis using water engaging the first plurality of water scoops
positioning a second wheel, smaller than the first wheel, in the source of flowing water, the second wheel comprising a second central hub on a second central axis, and a second plurality of water scoops arranged to engage the water source to turn the second wheel about a second central axis, the second wheel having a plurality of weights arranged substantially equally spaced about a circumferential portion of the second wheel;
coupling the first wheel to a first generator to provide external electric power;
coupling the second wheel to a second generator;
blowing air from a blower coupled to the second generator to the first plurality of water scoops and to the second plurality of water scoops.

13. The method of claim 12, and further comprising providing an air conduit from the second generator to the first plurality of water scoops, and from the second generator to the second plurality of water scoops, to provide blown air into the first plurality of water scoops and into the second plurality of water scoops.

14. The method of claim 12, and further comprising positioning a first plurality of weights substantially at and equally spaced about a circumferential portion of the first wheel distal from the first central hub.

15. The method of claim 14, wherein each plurality of weights is positioned on supporting spokes of its respective wheel.

16. The method of claim 12, and further comprising positioning the first central hub and the second central hub at or near ground level.

17. The method of claim 12, and further comprising providing a first plurality of magnets arranged on the circumferential portion of the first wheel, and at least a first magnetic driver arranged to engage the first plurality of magnets as the first wheel rotates about the first central axis.

18. The method of claim 12, and further comprising providing a second plurality of magnets arranged on the circumferential portion of the second wheel, and at least a second magnetic driver arranged to engage the second plurality of magnets as the second wheel rotates about the second central axis.

* * * * *